United States Patent
Utsunomiya et al.

(10) Patent No.: US 10,804,542 B2
(45) Date of Patent: Oct. 13, 2020

(54) GAS DIFFUSION ELECTRODE BASE, LAMINATE AND FUEL CELL

(71) Applicant: Toray Industries, Inc., Tokyo (JP)

(72) Inventors: Masamichi Utsunomiya, Otsu (JP); Yasuaki Tanimura, Otsu (JP); Toshiya Kamae, Ehime (JP); Junichi Urai, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 152 days.

(21) Appl. No.: 16/078,330

(22) PCT Filed: Mar. 27, 2017

(86) PCT No.: PCT/JP2017/012306
§ 371 (c)(1),
(2) Date: Aug. 21, 2018

(87) PCT Pub. No.: WO2017/170355
PCT Pub. Date: Oct. 5, 2017

(65) Prior Publication Data
US 2019/0058199 A1 Feb. 21, 2019

(30) Foreign Application Priority Data
Mar. 29, 2016 (JP) .................. 2016-065132

(51) Int. Cl.
*H01M 4/88* (2006.01)
*H01M 8/10* (2016.01)
(Continued)

(52) U.S. Cl.
CPC ............ *H01M 4/8807* (2013.01); *B32B 5/32* (2013.01); *B32B 27/30* (2013.01);
(Continued)

(58) Field of Classification Search
CPC ............ H01M 4/8807; H01M 4/8626; H01M 4/8657; H01M 4/96; H01M 8/10; B32B 5/32; B32B 27/30
See application file for complete search history.

(56) References Cited

U.S. PATENT DOCUMENTS

| 7,749,639 B2 | 7/2010 | Ichikawa et al. |
| 2005/0069754 A1 | 3/2005 | Kim et al. |

(Continued)

FOREIGN PATENT DOCUMENTS

| EP | 3396754 A1 | 10/2018 |
| JP | 3382213 B2 | 3/2003 |

(Continued)

OTHER PUBLICATIONS

Extended European Search Report for European Application No. 17 774 892.8, dated Oct. 16, 2019, 7 pages.

(Continued)

*Primary Examiner* — Jimmy Vo
(74) *Attorney, Agent, or Firm* — Ratnerprestia

(57) ABSTRACT

A gas diffusion electrode substrate has an electrically conductive porous substrate and a microporous layer-1 on one side of the electrically conductive porous substrate. The microporous layer-1 includes a dense portion A and a dense portion B. The dense portion A is a region containing a fluorine resin and a carbonaceous powder having a primary particle size of 20 nm to 39 nm. The dense portion A has a thickness of 30% to 100% with respect to the thickness of the microporous layer-1 as 100% and a width of 10 μm to 200 μm. The dense portion B is a region containing a fluorine resin and a carbonaceous powder having a primary particle size of 40 nm to 70 nm.

14 Claims, 1 Drawing Sheet

(51) Int. Cl.
  *B32B 27/30*  (2006.01)
  *B32B 5/32*  (2006.01)
  *H01M 4/96*  (2006.01)
  *H01M 4/86*  (2006.01)
  *H01M 8/1018*  (2016.01)

(52) U.S. Cl.
  CPC ....... *H01M 4/8626* (2013.01); *H01M 4/8657* (2013.01); *H01M 4/96* (2013.01); *H01M 8/10* (2013.01); *H01M 2008/1095* (2013.01)

(56) References Cited

U.S. PATENT DOCUMENTS

| | | |
|---|---|---|
| 2009/0081513 A1 | 3/2009 | Sasaki et al. |
| 2014/0134516 A1 | 5/2014 | Okuyama et al. |
| 2015/0140470 A1* | 5/2015 | Razack ............... H01M 8/1004 429/481 |

FOREIGN PATENT DOCUMENTS

| | | |
|---|---|---|
| JP | 2006004879 A | 1/2006 |
| JP | 2006097111 A | 4/2006 |
| JP | 2006310201 A | 11/2006 |
| JP | 2007123197 A | 5/2007 |
| JP | 2009070637 A | 4/2009 |
| JP | 2009081031 A | 4/2009 |
| JP | 2009238376 A | 10/2009 |
| JP | 2011175891 A | 9/2011 |
| JP | 2013127919 A | 6/2013 |

OTHER PUBLICATIONS

International Search Report and Written Opinion for International Application No. PCT/JP2017/012306, dated May 16, 2017—5 pages.

* cited by examiner

GAS DIFFUSION ELECTRODE BASE, LAMINATE AND FUEL CELL

CROSS REFERENCE TO RELATED APPLICATIONS

This is the U.S. National Phase application of PCT/JP2017/012306, filed Mar. 27, 2017, which claims priority to Japanese Patent Application No. 2016-065132, filed Mar. 29, 2016, the disclosures of these applications being incorporated herein by reference in their entireties for all purposes.

TECHNICAL FIELD OF THE INVENTION

A fuel cell is a mechanism by which energy generated by reaction between hydrogen and oxygen to produce water is electrically extracted. Since fuel cells have high energy efficiency and emit only water, they are expected to become more popular as clean energy. The present invention relates to a gas diffusion electrode substrate for use in a fuel cell. Among fuel cells, the invention particularly relates to a gas diffusion electrode substrate for use in a polymer electrolyte fuel cell, which is used as a power supply for fuel cell vehicles, etc.

BACKGROUND OF THE INVENTION

An electrode for use in a polymer electrolyte fuel cell is sandwiched between two separators in a polymer electrolyte fuel cell. Such an electrode is configured to have, on each side of a polymer electrolyte membrane, a catalyst layer formed on the surface of the polymer electrolyte membrane and a gas diffusion layer formed on the outer side of the catalyst layer. As separate members for forming gas diffusion layers, gas diffusion electrode substrates have been distributed. Such gas diffusion electrode substrates require properties such as gas diffusivity, electrical conductivity for collecting the electricity generated in the catalyst layer, and water drainage for efficiently removing moisture generated on the catalyst layer surface. In order to obtain such a gas diffusion electrode substrate, generally, an electrically conductive porous substrate having both gas diffusivity and electrical conductivity is used.

As an electrically conductive porous substrate, specifically, a carbon felt, a carbon paper, a carbon cloth, or the like made of carbon fiber is used. In particular, from the viewpoint of mechanical strength and the like, carbon papers are believed to be the most preferable.

Since a fuel cell is a system for electrically extracting the energy generated upon production of water by reaction between hydrogen and oxygen, an increase in the electric load, that is, an increase in the current to be extracted to the outside of the cell, causes production of a large amount of water (water vapor). At a low temperature, such water vapor is condensed into water drops, which block pores of the gas diffusion electrode substrate and thus reduce the amount of gas (oxygen or hydrogen) supplied to the catalyst layer, resulting in decreasing the voltage. This phenomenon is called "flooding".

In order to minimize the occurrence of flooding, a gas diffusion electrode substrate is required to have water drainage. As a means for enhancing the water drainage, usually, a gas diffusion electrode substrate including an electrically conductive porous substrate that has been subjected to water-repellent treatment is used to increase water repellency.

In addition, when the water-repellent-treated electrically conductive porous substrate is directly used as a gas diffusion electrode substrate, because its fiber mesh is coarse, large water drops are produced as a result of the condensation of water vapor. This easily leads to flooding. Therefore, in some cases, a coating liquid having dispersed therein carbonaceous powder such as carbon black is applied to a water-repellent-treated electrically conductive porous substrate, and the coating liquid is then dried and sintered to provide a so-called microporous layer (which is also referred to as microporous layer). There is a known technology which allows this microporous layer to contain a fluorine resin as a water-repellent resin in order to impart water-repellency also to the microporous layer (Patent Documents 1 and 2).

Patent Documents
 Patent Document 1: JP 3382213 B2
 Patent Document 2: JP 2006-4879 A

SUMMARY OF INVENTION

However, the technologies disclosed in the above-mentioned Patent Documents 1 and 2 may allow the carbon fibers protruded from the electrode substrate surface to prick the polymer electrolyte membrane, thereby causing short circuit and reaction gas cross leakage and reducing the power generation performance of a fuel cell over time.

An object of the present invention is to provide a gas diffusion electrode substrate that overcomes such drawbacks of the conventional technologies and achieves both durability and flooding resistance.

In order to solve the above problems, the present invention employs the following means.

A gas diffusion electrode substrate including:
 an electrically conductive porous substrate and
 a microporous layer 1 on one side of the electrically conductive porous substrate;
 in which the microporous layer 1 includes a dense portion A and a dense portion B;
 in which the dense portion A is a region including a fluorine resin and a carbonaceous powder having a primary particle size of 20 nm to 39 nm;
 in which the dense portion A has a thickness of 30% to 100% with respect to the thickness of the microporous layer 1 as 100%, and a width of 10 μm to 200 μm; and
 in which the dense portion B is a region including a fluorine resin and a carbonaceous powder having a primary particle size of 40 nm to 70 nm.

The present invention includes a laminate having a catalyst layer on the microporous layer side of the above-mentioned gas diffusion electrode substrate.

The present invention includes a fuel cell having the above-mentioned gas diffusion electrode substrate.

The use of the gas diffusion electrode substrate according to the present invention enables an attempt to be made to achieve both short circuit resistance and flooding resistance and thus can provide a fuel cell having high power generation performance and high durability.

DETAILED DESCRIPTION OF EMBODIMENTS OF THE INVENTION

Figure 1:
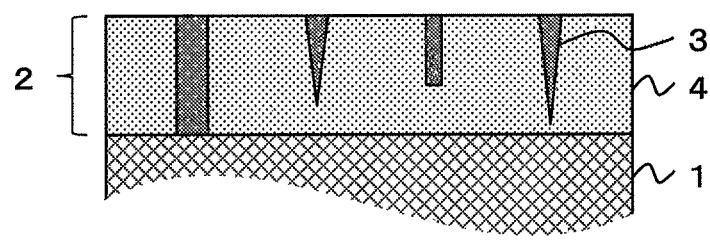
FIG. 1 is a schematic diagram showing the configuration of an example of the gas diffusion electrode substrate of the present invention.

The gas diffusion electrode substrate of the present invention includes a microporous layer 1 on at least one side of an electrically conductive porous substrate.

Specifically, as the electrically conductive porous substrate, for example, it is preferable to use a carbon-fiber-containing porous substrate such as a carbon fiber fabric, carbon fiber paper-like body, carbon fiber non-woven fabric, carbon felt, carbon paper, or carbon cloth, or a metal porous substrate such as a foamed sintered metal, metal mesh, or an expanded metal. Among them, from the viewpoint of excellent corrosion resistance, it is preferable to use a carbon-fiber-containing porous substrate such as a carbon felt, carbon paper, or carbon cloth. Further, in terms of excellent "springiness", that is, the property of absorbing dimensional changes in the thickness direction of an electrolyte membrane, it is preferable to use a substrate made of carbon fiber paper-like bodies bound together with a carbide, that is, a carbon paper.

With a view to enhancing gas diffusivity, it is preferable to make the thickness of the electrically conductive porous substrate smaller. The electrically conductive porous substrate has a thickness of preferably 220 μm or less, more preferably 150 μm or less, particularly preferably 120 μm or less. Having too small a thickness reduces the mechanical strength and makes it difficult to handle the electrically conductive porous substrate in production processes, owing to which the thickness is preferably 70 μm or more.

As the electrically conductive porous substrate, one subjected to water-repellent treatment is preferably used. Since a fluorine resin acts as a water-repellent resin, the electrically conductive porous substrate preferably contains a water-repellent resin such as a fluorine resin. Examples of fluorine resins include PTFE (polytetrafluoroethylene) (e.g., "Teflon" (registered trademark)), FEP (tetrafluoroethylene-hexafluoropropylene copolymer), PFA (perfluoroalkoxy fluoride resin), ETFA (ethylene-tetrafluoroethylene copolymer), PVDF (polyvinylidene fluoride), and PVF (polyvinyl fluoride). PTFE, which shows strong water repellency, or FEP is preferred.

The amount of the water-repellent resin contained is not limited to a particular value, and is preferably about 0.1% by mass to 20% by mass in a total of 100% by mass of the electrically conductive porous substrate. The contained amount below 0.1% by mass may not allow the water repellency to be sufficiently produced. On the other hand, the contained amount exceeding 20% by mass may cause pores serving as the gas diffusion path or the water drainage path to be blocked and may increase the electrical resistance.

As methods of the water-repellent treatment of the electrically conductive porous substrate, a treatment technique by immersion of the electrically conductive porous substrate in a dispersion containing a generally known water-repellent resin, as well as a coating technique by application of a water-repellent resin to the electrically conductive porous substrate by die coating, spray coating, or the like may be applied. Processing by a dry process such as sputtering of a fluorine resin to an electrically conductive porous substrate may also be applied. After the water-repellent treatment, a drying step, a sintering step, and/or the like may be further included, if necessary.

Next, the microporous layers are described below. In this regard, the term "microporous layer" alone refers collectively to the below-mentioned microporous layer 1 and microporous layer 2.

The microporous layer, in other words, the microporous layer 1 and the microporous layer 2, is a layer containing a carbonaceous powder and a fluorine resin.

Examples of carbonaceous powders include carbon black, carbon nanotube, carbon nanofiber, graphene, graphite, and the like. Among these carbonaceous powders, carbon black is preferably used from the viewpoint of low cost, high safety, and high stability of product quality. A carbon black used as a carbonaceous powder, acetylene black is preferably used because it contains less impurities, and is therefore less likely to reduce the activity of a catalyst.

In addition, the microporous layer is required to have properties such as electrical conductivity, gas diffusivity, water drainage, moisture retention, and thermal conductivity, as well as strong acid resistance in the anode side and oxidation resistance in the cathode side inside a fuel cell. Therefore, the microporous layer contains a fluorine resin in addition to the carbonaceous powder. Examples of the fluorine resin contained in the microporous layer include PTFE, FEP, PFA, and ETFA, similarly to the fluorine resin preferably used for the water-repellent treatment of the electrically conductive porous substrate. From the viewpoint of particularly high water repellency, PTFE or FEP is preferable.

The microporous layer may be composed of a plurality of layers, i.e., two or more layers. A plurality of layers in the microporous layer are called the microporous layer 1, the microporous layer 2, etc., respectively from the electrically conductive porous substrate side.

The functions of the microporous layer are (1) protection of a catalyst layer, (2) prevention of condensation of water vapor generated at the cathode, and the like. To achieve the effect of protection of a catalyst layer among these, the microporous layer preferably has a certain degree of thickness.

The thickness of the microporous layer 1 is preferably more than 10 μg and 60 μg or less in terms of dried film thickness, considering the roughness of current electrically conductive porous substrates. The microporous layer 1*l* having a thickness of 10 μm or less may allow the above-mentioned catalyst layer protection effect to be insufficient. The thickness exceeding 60 μm may reduce the gas diffusivity of the gas diffusion electrode substrate itself and increase the electrical resistance. From the viewpoint of increasing the gas diffusivity or reducing the electrical resistance, the microporous layer 1 has a thickness of preferably 50 μg or less, more preferably 40 μg or less.

The microporous layer has a thickness of preferably 0.5 μg or more, more preferably 1 μg or more. The microporous layer 2 having a thickness of 0.5 μg or more is preferable in view of the larger catalyst layer protection effect and higher short circuit resistance. In addition, the thickness of the microporous layer 2 is preferably 10 μm or less, more preferably 7 μg or more. The microporous layer 2 having a thickness of 10 μg or less allows the gas diffusion electrode substrate to have lower electrical resistance and higher gas diffusivity, and allows the fuel cell to have higher power generation performance.

The microporous layer 1 (2) includes a dense portion A (3) and a dense portion B (4) (FIG. 1). Here, the dense portion A is a region including a fluorine resin and a carbonaceous powder having a primary particle size of 20 nm to 39 nm, and the dense portion B is a region including a fluorine resin and a carbonaceous powder having a primary particle size of 40 nm to 70 nm. The dense portion A has a thickness of 30% to 100%, with respect to the thickness of the microporous layer 1 as 100%, and a width of 10 μm to 200 μm.

The dense portion A has a thickness of preferably 40% or more, more preferably 50% or more, with respect to the thickness of the microporous layer as 100%. The dense portion A having a thickness of 30% or more can inhibit the microporous layer 1 from breaking. The dense portion A has a thickness of preferably 95% or less, more preferably 90% or less, with respect to the thickness of the microporous layer 1 as 100%. The dense portion A having a thickness of 100% or less does not allow the dense portion A to enter the electrically conductive porous substrate (1), and accordingly the gas diffusivity is not reduced, thus affording both power generation performance and short circuit resistance.

Here, the expression "can inhibit the microporous layer 1 from breaking" specifically means that a difference (T(0.15)–T(3.00)) between the thickness of a gas diffusion electrode substrate under a pressure of 0.15 MPa T(0.15) and the thickness of a gas diffusion electrode substrate under a pressure of 3.00 MPa T(3.00) becomes smaller. This increases the short circuit resistance of the gas diffusion electrode substrate.

The dense portion A has a width of preferably 15 μm or more, more preferably 20 μm or more. The dense portion A having a width of 10 μm or more can inhibit the microporous layer 1 from breaking. The dense portion A has a width of preferably 150 μm or less, more preferably 100 μm or less. The dense portion A having a width of 200 μm or less does not allow the in-plane direction gas diffusivity of the microporous layer 1 to be reduced, thus affording both power generation performance and short circuit resistance. A method of measuring the width of the dense portion A will be described below.

The carbonaceous powder contained in the dense portion A has a primary particle size of preferably 23 nm or more, more preferably 26 nm or more. The 20 nm or more primary particle size of the carbonaceous powder contained in the dense portion A allows the dense portion A to have a larger pore size, and allows the dense portion A to have higher gas diffusivity. The carbonaceous powder contained in the dense portion A has a primary particle size of preferably 37 nm or less, more preferably 35 nm or less. The 39 nm or less primary particle size of the carbonaceous powder contained in the dense portion A allows the dense portion A to have a larger density, and can inhibit the microporous layer 1 from breaking.

The carbonaceous powder contained in the dense portion B has a primary particle size of preferably 43 nm or more, more preferably 46 nm or more. The 40 nm or more primary particle size of the carbonaceous powder contained in the dense portion B allows the dense portion B to have a larger pore size, and allows the dense portion B to have higher gas diffusivity. The carbonaceous powder contained in the dense portion B has a primary particle size of preferably 65 nm or less, more preferably 60 nm or less. The 70 nm or less primary particle size of the carbonaceous powder contained in the dense portion B allows the dense portion B to achieve enhanced smoothness, the adhesiveness between the gas diffusion electrode substrate and the catalyst layer to be enhanced, the electrical resistance to be smaller, and the power generation performance to be enhanced.

Figure 2:
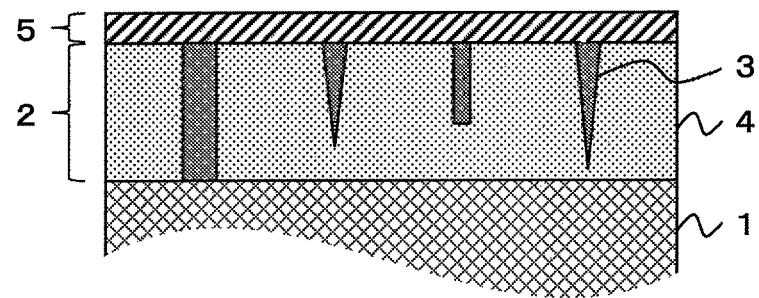
FIG. 2 is a schematic diagram showing the configuration of another example of the gas diffusion electrode substrate of the present invention.

In a more preferred aspect, the gas diffusion electrode substrate of the present invention further has, on the microporous layer 1, a microporous layer 2 (5) which contains a fluorine resin and a carbonaceous powder having a primary particle size of 20 nm to 39 nm, and which has a thickness of 10 μm or less (FIG. 2). The carbonaceous powder contained in the microporous layer 2 has a primary particle size of more preferably 26 nm or more. The 20 nm or more primary particle size of the carbonaceous powder contained in the microporous layer 2 allows the microporous layer 2 to have a larger pore size, and the microporous layer 2 to have higher gas diffusivity. The carbonaceous powder contained in the microporous layer 2 has a primary particle size of more preferably 35 nm or less. The 39 nm or less primary particle size of the carbonaceous powder contained in the microporous layer 2 allows the microporous layer 2 to have a larger density, and the microporous layer 2 to be less prone to breaking, affording higher short circuit resistance.

Here, for the primary particle size of the carbonaceous powder, a photograph of the carbonaceous powder is taken at a magnification ratio of 500,000× or more using a microscope such as a scanning electron microscope, a transmission electron microscope, and the like to measure the sizes of 100 particles of the carbonaceous powder, and the average value thereof is regarded as the primary particle size of the carbonaceous powder. As the scanning electron microscope, S-4800, made by Hitachi, Ltd., or its equivalent may be used. In measurement using a scanning electron microscope, an ion milling apparatus such as IM4000, made by Hitachi High-Technologies Corporation, is used to cut the gas diffusion electrode substrate in the thickness direction, and the perpendicular cross-section (cross-section in the thickness direction) can be observed with a scanning electron microscope, followed by calculating the thickness based on the image observed.

The difference (T(0.15)–T(3.00)) between the thickness of a gas diffusion electrode substrate under a pressure of 0.15 MPa T(0.15) and the thickness of a gas diffusion electrode substrate under a pressure of 3.00 MPa T(3.00) is preferably 30 μm or more, more preferably 40 μm more. The T(0.15)–T(3.00) value of 30 μm or more allows the thickness of the gas diffusion electrode substrate to vary in response to the swelling-shrinking of the electrolyte membrane inside a fuel cell, and thus the pressure applied to the electrolyte membrane is uniformized, owing to which the durability of the fuel cell is enhanced. The T(0.15)–T(3.00) value is preferably 60 μm or less, more preferably 55 μm or less. The T(0.15)–T(3.00) value of 60 μm or less allows the gas electrode substrate to be less prone to cause protrusion of the carbon fibers from the surface thereof, have higher short circuit resistance, and enhance the durability of the fuel cell.

The pore size peak of the dense portion B is preferably larger than the pore size peak of the dense portion A. The pore size peak of the dense portion B being larger than the pore size peak of the dense portion A allows the dense portion B to have higher gas diffusivity, and the dense portion A to work to inhibit the microporous layer 1 from breaking, whereby the power generation performance and the short circuit resistance can both be achieved.

In addition, the pore size peak of the dense portion B is preferably larger than the pore size peak of the microporous layer 2. The pore size peak of the dense portion B being larger than the pore size peak of the microporous layer 2 facilitates water transfer from the microporous layer 2 to the dense portion B, and allows the gas diffusion electrode substrate to have high water drainage performance. In addition, the presence of the microporous layer 2 having a smaller pore size on the surface of the gas diffusion electrode substrate allows the gas diffusion electrode substrate to achieve enhanced smoothness, enhanced adhesiveness between the gas diffusion electrode substrate and the catalyst layer, and smaller electrical resistance, whereby the gas diffusion electrode substrate achieves enhanced power generation performance.

The dense portion A has a pore size peak of preferably 0.05 µm or more, more preferably 0.07 µg or more. The dense portion A having a pore size peak of 0.05 µm or more allows the dense portion A to have higher gas diffusivity, and accordingly allows the gas diffusion electrode substrate to have higher power generation performance. In addition, the dense portion A has a pore size peak of preferably 0.20 µm or less, more preferably 0.18 µg or less. The dense portion A having a pore size peak of 0.20 µm or less allows the dense portion A to be less prone to breaking, and this can inhibit the microporous layer 1 from breaking, owing to which the higher short circuit resistance is achieved. The pore size peak of the dense portion A can be controlled by varying the primary particle size of the carbonaceous powder contained in the dense portion A and the pore size peak of the dense portion B. Reducing the pore size peak of the dense portion B or reducing the primary particle size of the carbonaceous powder contained in the dense portion A reduces the pore size peak of the dense portion A.

The dense portion B has a pore size peak of preferably 0.21 µg or more, more preferably 0.30 µm or more. The dense portion B having a pore size peak of 0.21 µm or more allows the dense portion B to have higher gas diffusivity, and accordingly allows the gas diffusion electrode substrate to have higher power generation performance. In addition, the dense portion B has a pore size peak of preferably 0.60 µm or less, more preferably 0.50 µm or less. The dense portion B having a pore size peak of 0.60 µm or less allows the dense portion B to be less prone to liquid water aggregation thereinside, thus affording enhanced flooding resistance. The pore size peak of the dense portion B can be controlled by varying the primary particle size of the carbonaceous powder contained in the dense portion B and the amount of fluorine resin contained in the dense portion B. Increasing the primary particle size of the carbonaceous powder contained in the dense portion B or reducing the amount of fluorine resin contained in the dense portion B increases the pore size peak of the dense portion B.

The microporous layer 2 has a pore size peak of preferably 0.05 µm or more, more preferably 0.07 µm or more. The microporous layer 2 having a pore size peak of 0.05 µm or more allows the microporous layer 2 to have higher gas diffusivity, and accordingly allows the gas diffusion electrode substrate to have higher power generation performance. The microporous layer 2 has a pore size peak of preferably 0.20 µm or less, more preferably 0.18 µm or less. The microporous layer 2 having a pore size peak of 0.20 µm or less allows the microporous layer 2 to be less prone to breaking, owing to which higher short circuit resistance is achieved. The pore size peak of the microporous layer 2 can be controlled by varying the primary particle size of the carbonaceous powder contained in the microporous layer 2 and the pore size peak of the dense portion B. Reducing the pore size peak of the dense portion B or reducing the primary particle size of the carbonaceous powder contained in the microporous layer 2 reduces the pore size peak of the microporous layer 2.

The contact angle between water and the microporous layer side surface of the gas diffusion electrode substrate is preferably 130 degrees or more. It is more preferably 135 degrees or more. The contact angle of 130 degrees or more to water allows the microporous layer to be less prone to water condensation thereinside, thus affording high flooding resistance. The contact angle between water and the microporous layer side surface of the gas diffusion electrode substrate is preferably 170 degrees or less. It is more preferably 160 degrees or less. The contact angle of 170 degrees or less to water enhances the adhesiveness between the microporous layer and the catalyst layer, and enhances the durability of a fuel cell.

The number of fluffy points of the electrically conductive porous substrate is preferably 1.0 point/cm$^2$ or less, more preferably 0.7 points/cm$^2$ or less. The 1.0 point/cm$^2$ or less number of fluffy points of the electrically conductive porous substrate allows the carbon fibers to less frequently prick the polymer electrolyte membrane, whereby the durability of a fuel cell is enhanced. The smaller the number of fluffy points of the electrically conductive porous substrate is, the more preferable it is, and it is usually 0.1 points/cm$^2$ or more. Here, the number of fluffy points of the electrically conductive porous substrate refers to a value determined by: observing a side of the electrically conductive porous substrate using a digital microscope; counting the number of carbon fibers protruding 100 µm or more from the surface of the electrically conductive porous substrate; and dividing the number by a measurement area determined from the top surface of the electrically conductive porous substrate.

The number of fluffy points of the microporous layer side of the gas diffusion electrode substrate is preferably 0.5 points/cm$^2$ or less, more preferably 0.2 points/cm$^2$ or less. The number of fluffy points of 0.5 points/cm$^2$ or less, as measured on the microporous layer side of the gas diffusion electrode substrate, allows the carbon fibers to less frequently prick the polymer electrolyte membrane, whereby the durability of a fuel cell is enhanced. The smaller the number of fluffy points measured on the microporous layer side of the gas diffusion electrode substrate is, the more preferable it is, and it is usually 0.01 points/cm$^2$ or more. Here, the number of fluffy points of the gas diffusion electrode substrate refers to a value determined by: observing a side of the gas diffusion electrode substrate using a digital microscope; counting the number of carbon fibers protruding 100 µm or more from the microporous layer side surface of the gas diffusion electrode substrate; and dividing the number by a measurement area determined from the top surface of the gas diffusion electrode substrate.

A method of producing a gas diffusion electrode substrate having a microporous layer on one side of an electrically conductive porous substrate is commonly a method in which a coating liquid for formation of a microporous layer (hereinafter referred to as a microporous layer coating liquid) is applied to an electrically conductive porous substrate. A microporous layer coating liquid contains, for example, the above-mentioned carbonaceous powder, a fluorine resin, and a dispersion medium such as water or alcohol. In addition, as a dispersant for dispersing a carbonaceous powder and a fluorine resin, a surfactant or the like is often included therein.

As a method of forming a microporous layer on an electrically conductive porous substrate, there is known a transfer method in which a substrate film such as a PET film is once coated with a microporous layer coating liquid to form a microporous layer, then the microporous layer face is pressed and bonded onto the electrically conductive porous substrate, and the substrate film is peeled off. However, the transfer method may complicate the production processes or fail to afford sufficient adhesiveness between the electrically conductive porous substrate and the microporous layer. Owing to this, a method of forming a microporous layer is preferably a method in which an electrically conductive porous substrate is coated with a microporous layer coating liquid.

The microporous layer may be composed of a plurality of layers, i.e., two or more layers. A microporous layer having a plurality of layers is preferably formed by applying a microporous layer coating liquid a plurality of times.

A microporous layer coating liquid used to make the dense portion A preferably has a composition different from a composition that a microporous layer coating liquid used to make the dense portion B has. The dense portion A and the microporous layer 2 are preferably made using a microporous layer coating liquid having the same composition. Below, the microporous layer coating liquid for the dense portion A, the microporous layer coating liquid for the dense portion B, and the microporous layer coating liquid for the microporous layer 2 are described as the microporous layer coating liquid A, the microporous layer coating liquid B, and the microporous layer coating liquid 2 respectively.

The application of the microporous layer coating liquid to the electrically conductive porous substrate can be carried out using various kinds of commercially available coating devices. Examples of coating methods that may be used therefor include screen printing, rotary screen printing, spraying, intaglio printing, gravure printing, die coating, bar coating, blade coating, knife coating, ink jet coating, and the like. Dye coating is preferred since the coating amount can be made constant independent of the surface roughness of the electrically conductive porous substrate. In a case where a gas diffusion electrode substrate is incorporated in a fuel cell and where smoothness of the microporous layer surface is required for increasing its adhesion to a catalyst layer, a blade coater or a knife coater is preferably used. The above examples of the coating method are merely for the illustration purpose, and the method is not limited thereto.

First, the electrically conductive porous substrate is coated with the microporous layer coating liquid B to form the dense portion B. The dense portion B is provided with concaves in which the dense portion A is formed later. Examples of preferable methods of forming such a dense portion B include: a method in which the electrically conductive porous substrate is coated with the microporous layer coating liquid B in patterned form using screen printing or gravure printing; a method in which a slit die coater is used for coating in sheet form, and then the resulting coating is dried and is thereby provided with cracks; a method in which a slit die coater is used for coating in sheet form, and then the resulting coating film is mechanically scored and is thereby provided with concaves; a method in which a slit die coater is used for coating in sheet form, and then the resulting coating film is provided with concaves by laser processing.

The dense portion A is preferably made such that the concaves of the dense portion B are filled with the dense portion A, by preparing the dense portion B provided with concaves as above-mentioned, and then coating it with the microporous layer coating liquid A, and drying it.

The microporous layer 2 may be formed by forming the dense portion A and the dense portion B followed by applying and drying the microporous layer coating liquid 2 thereon, or the dense portion A and the microporous layer 2 may be simultaneously formed by forming a thick coating in applying the dense portion A. Using the same composition for the microporous layer coating liquid A and the microporous layer coating liquid 2 is preferable because the simultaneous formation using thick coating can be carried out as above-mentioned.

The concentration of the carbonaceous powder in the microporous layer coating liquid is preferably 5% by mass or more, more preferably 10% by mass or more, from a productivity viewpoint. There is no upper limit to the concentration as long as the viscosity, the dispersion stability of the electrically conductive particles, the coating properties of the coating liquid, and the like are suitable. In practice, the microporous layer coating liquid with the carbonaceous powder concentration of more than 50% by mass may lose suitability needed for a coating liquid, and accordingly the concentration is preferably 50% by mass or less.

In order to enhance the dispersibility of the carbonaceous powder in the microporous layer coating liquid, a dispersant is preferably added in preparing the microporous layer coating liquid.

In order to adjust the viscosity of the microporous layer coating liquid, a thickener may be added. As a thickener used here, one which is generally known can be used. Examples of thickeners preferably used include methyl cellulose-based, polyethylene glycol-based, or polyvinyl alcohol-based thickeners.

One substance having the functions of both the dispersant and the thickener may be used, or materials each suitable for each function may be selected. In cases where the thickener and the dispersant are separately selected, it is preferred to select those that do not destroy the dispersion system of the carbonaceous powder and the dispersion system of the fluorine resin, which is a water-repellent resin. The dispersant and the thickener are herein collectively referred to as surfactant. The total amount of the surfactant is preferably 50 parts by mass or more, more preferably 100 parts by mass or more, still more preferably 200 parts by mass or more, with respect to the mass of the carbonaceous powder as 100 parts by mass. The upper limit of the added amount of the surfactant is preferably 500 parts by mass or less, with respect to the mass of the carbonaceous powder as 100 parts by mass. The added amount exceeding this may cause the generation of vapor and decomposition gas to increase in a subsequent sintering step.

After the application of the microporous layer coating liquid, the dispersion medium (water, in cases of an aqueous system) in the microporous layer coating liquid is removed by drying, if necessary. In cases where the dispersion medium is water, the temperature during the drying after the application is preferably from room temperature (about 20° C.) to 150° C., more preferably from 60° C. to 120° C. The drying of the dispersion medium may be carried out simultaneously with the later sintering step.

Preferably, after the application of the microporous layer coating liquid, sintering is carried out for the purpose of removing the surfactant used for the microporous layer coating liquid, and for the purpose of once dissolving the water-repellent resin to bind the carbonaceous powder.

The sintering is preferably carried out at a temperature of 250° C. to 400° C., although the temperature depends on the boiling point or the decomposition temperature of the surfactant added. In cases where the sintering temperature is less than 250° C., the removal of the surfactant may be insufficient, or some time may be required for complete removal of the surfactant. In cases where the sintering temperature exceeds 400° C., degradation of the water-repellent resin may occur.

From a productivity viewpoint, the sintering time is as short as possible, preferably 20 minutes or less, more preferably 10 minutes or less, still more preferably 5 minutes or less. However, sintering in a very short period may cause rapid generation of vapor of the surfactant and decomposition organism, and poses a risk of ignition in cases where the sintering is carried out in the air. The sintering time is preferably 10 seconds or more, more preferably 20 seconds or more, still more preferably 30 seconds or more.

A manufacturing apparatus suitable for production of the gas diffusion electrode substrate of the present invention includes: an unwinding machine for unwinding a long electrically conductive porous substrate wound in a roll shape; a first coater for application of a microporous layer coating liquid A to an electrically conductive porous substrate unwound by the unwinding machine; a second coater for application of a microporous layer coating liquid B or a microporous layer coating liquid 2 to the electrically conductive porous substrate to which the microporous layer coating liquid A has been applied, which second coater is arranged in the same side as the first coater relative to the electrically conductive porous substrate; a dryer for drying the electrically conductive porous substrate to which the microporous layer coating liquid has been applied; and a wind-up machine for winding up the gas diffusion electrode substrate obtained.

<Laminate>

The laminate of the present invention is a laminate having a catalyst layer on the microporous layer side of the gas diffusion electrode substrate of the present invention. For example, the laminate of the present invention can be formed by joining the gas diffusion electrode substrate of the present invention onto at least one side of a polymer electrolyte membrane having a catalyst layer on each side thereof. In this formation, arranging the microporous layer on the catalyst layer side not only facilitates back diffusion of generated water but also increases the contact area between the catalyst layer and the gas diffusion electrode substrate, and can reduce the contact electrical resistance. In cases where a microporous layer is composed of two layers, the microporous layer 2 thereof is in contact with a catalyst layer.

<Fuel Cell>

The fuel cell of the present invention includes the gas diffusion electrode substrate of the present invention. A fuel cell is obtained by pressing and bonding the gas diffusion electrode substrate of the present invention onto a catalyst layer provided on both sides of an electrolyte membrane such that the catalyst layer is in contact with the microporous layer, followed by further arranging a separator on both sides. In other words, a fuel cell can be configured by arranging a separator on both sides of the above-mentioned laminate. A polymer electrolyte fuel cell is usually configured by layering a plurality of such single cells.

A catalyst layer is composed of a polymer electrolyte and a layer containing a catalyst supported on carbon. Platinum is usually used as the catalyst. For a fuel cell in which a modified gas containing carbon monoxide is supplied to the anode side, platinum and ruthenium are preferably used as the catalyst at the anode side. For the polymer electrolyte, a perfluorosulfonic acid polymer material having high protonic conductivity, oxidation resistance, and heat resistance is preferably used.

EXAMPLES

The present invention is described below more specifically by way of Examples. The materials, the methods of preparing the electrically conductive porous substrates, and the methods of evaluating the cell performances of the fuel cells used in the Examples were as follows.

<Materials>

A: electrically conductive porous substrates

A sheet of carbon paper having a thickness of 150 μm and a porosity of 85% was prepared in the following manner.

Polyacrylonitrile-based carbon fiber "TORAYCA" (registered trademark) T300 (average single-fiber diameter: 7 μm), made by Toray Industries, Inc., was cut to a length of 12 mm, and subjected to continuous papermaking using water as a papermaking medium, followed by immersion in a 10% by mass aqueous polyvinyl alcohol solution, and then drying. After this papermaking process, the paper was wound up into a roll shape, to obtain a long sheet of carbon fiber paper having an areal weight of carbon staple of 15 g/m$^2$. Per 100 parts by mass of the carbon fiber, the amount of polyvinyl alcohol attached was equivalent to 20 parts by mass.

A dispersion was prepared by mixing a flake graphite (average particle size: 5 μm), a phenol resin, and methanol at a mass ratio of 5:10:85. The above carbon fiber paper was continuously impregnated with the above dispersion to have 130 parts by mass of the resin component (the phenol resin and the flake graphite) per 100 parts by mass of the carbon staple, followed by drying at a temperature of 100° C. for 5 minutes. After this resin impregnation step, the carbon paper was wound up into a roll shape, to obtain a resin-impregnated carbon fiber paper. As the phenol resin, a resin prepared by mixing a resol-type phenol resin and a novolac-type phenol resin at a mass ratio of 1:1 was used.

A compression treatment step was carried out to the resin-impregnated carbon fiber paper obtained as above-mentioned, in which step, with the hot plates set in parallel with each other on a flat plate press and with a spacer disposed on the lower hot plate, the resin-impregnated carbon fiber paper was intermittently conveyed into the flat plate press and heat-treated at a hot plate temperature of 180° C. for five minutes.

The compression-treated carbon fiber paper was introduced, as a precursor fiber sheet, into a heating oven at a maximum temperature of 2400° C. in which a nitrogen gas atmosphere was maintained. After this carbonization step for firing, the sheet was wound up into a roll shape, to obtain a carbon paper. The obtained carbon paper had a density of 0.25 g/cm$^3$ and a porosity of 85%.

The carbon paper made as above-mentioned was cut to 15 cm×12.5 cm and immersed in a water dispersion of a PTFE resin ("POLYFLON" (registered trademark) PTFE dispersion D-201C (made by Daikin Industries, Ltd.)) to thereby impregnate the carbon paper with the fluorine resin. Then, the resultant paper was heated and dried at a temperature of 100° C. in a drying oven for five minutes to obtain an electrically conductive porous substrate. The above-mentioned water dispersion of the PTFE resin was used after it was diluted to a concentration such that, when it was dried, 5 parts by mass of the fluorine resin would be contained with respect to 95 parts by mass of the carbon paper.

B: carbon black 1
primary particle size: 58 nm
C: carbon black 2
primary particle size: 30 nm
D: fluorine resin
"NEOFLON" (registered trademark) FEP dispersion ND-110 (FEP resin made by Daikin Industries, Ltd.)
D: surfactant
"TRITON" (registered trademark) X-100 (made by Nacalai Tesque, Inc.)

<Thickness Measurement of Microporous Layer 1 and Microporous Layer 2>

The thicknesses of the microporous layer 1 and the microporous layer 2 were calculated using the observations of the image of a cross-section perpendicular to the face (thickness direction cross-section) of the gas diffusion electrode substrate cut in the thickness direction using an ion milling device, in which the image was photographed from the cross-section at a magnification ratio of 500× or more using a scanning electron microscope (SEM) with a pressure of 0.15 MPa applied to the substrate. The distance from the interface between the electrically conductive porous substrate and the microporous layer 1 to the interface between the microporous layer 2 and the microporous layer 1 was regarded as the thickness of the microporous layer 1, and the average value was determined in 10 fields of view. Further, the distance from the interface between the microporous layer 1 and the microporous layer 2 to the surface of the microporous layer 2 was regarded as the thickness of the microporous layer 2, and the average value was determined in 10 fields of view. As the ion milling apparatus, the IM4000, made by Hitachi High-Technologies Corporation, was used. As the scanning electron microscope (SEM), S-4800, made by Hitachi, Ltd., was used. For a substrate having no microporous layer 2, the distance from the interface between the electrically conductive porous substrate and the microporous layer 1 to the surface of the microporous layer 1 was regarded as the thickness microporous layer 1.

<Thickness Measurement of Dense Portion B>

The thicknesses of the dense portion B were calculated using the observations of the image of a cross-section perpendicular to the face (thickness direction cross-section) of the gas diffusion electrode substrate cut in the thickness direction using an ion milling device, in which the image was photographed from the cross-section at a magnification ratio of 500× or more using a scanning electron microscope (SEM) with a pressure of 0.15 MPa applied to the substrate. The distance from the interface between the electrically conductive porous substrate and the dense portion B to the interface of the microporous layer 2 and the dense portion B was regarded as the thickness of the dense portion B, and the average value was determined in 10 fields of view. As the ion milling apparatus, the IM4000, made by Hitachi High-Technologies Corporation, was used. As the scanning electron microscope (SEM), S-4800, made by Hitachi, Ltd., was used. For a substrate having no microporous layer 2, the distance from the interface between the electrically conductive porous substrate and the dense portion B to the surface of the microporous layer 1 was regarded as the thickness dense portion B.

<Thickness Measurement of Dense Portion A>

The thicknesses of the dense portion A were calculated using the observations of the image of a cross-section perpendicular to the face (thickness direction cross-section) of the gas diffusion electrode substrate cut in the thickness direction using an ion milling device, in which the image was photographed from the cross-section at a magnification ratio of 500× or more using a scanning electron microscope (SEM) with a pressure of 0.15 MPa applied to the substrate. The distance from the interface between the electrically conductive porous substrate and the dense portion A to the interface of the microporous layer 2 and the dense portion A was regarded as the thickness of the dense portion A, and the average value was determined in 10 fields of view. As the ion milling apparatus, the IM4000, made by Hitachi High-Technologies Corporation, was used. As the scanning electron microscope (SEM), S-4800, made by Hitachi, Ltd., was used. For a substrate having no microporous layer 2, the distance from the interface between the electrically conductive porous substrate and the dense portion A to the surface of the microporous layer 1 was regarded as the thickness dense portion A.

<Width Measurement of Dense Portion A>

The width of the dense portion A was measured using the observations of the image of a cross-section perpendicular to the face (thickness direction cross-section) of the gas diffusion electrode substrate cut in the thickness direction using an ion milling device, in which the image was photographed from the cross-section at a magnification ratio of 500× or more using a scanning electron microscope (SEM) with a pressure of 0.15 MPa applied to the substrate, and such measurements of 100 dense portion A points were taken, the average value of which measurements was regarded as the width of the dense portion A. As the ion milling apparatus, the IM4000, made by Hitachi High-Technologies Corporation, was used. As the scanning electron microscope (SEM), S-4800, made by Hitachi, Ltd., was used.

<Measurement of T(0.15)−T(3.00)>

The thickness of a gas diffusion electrode substrate under a pressure of 0.15 MPa T(0.15) and the thickness of a gas diffusion electrode substrate under a pressure of 3.00 MPa T(3.00) were determined using a digital micrometer, and the difference (T(0.15)−T(3.00)) was calculated.

<Measurement of Pore Size Peak of Dense Portion B>

The pore size peak of the dense portion B was determined from the distribution that was obtained using a mercury intrusion technique and showed the pore volume with respect to the pore size of the dense portion B. The peak size of the highest peak in the pore size range of 0.01 to 1.00 μm was regarded as the pore size peak of the dense portion B.

The procedures for determining the pore size peak of the dense portion B will be described below. First, three sample pieces having a rectangular size of approximately 12 mm×20 mm were cut out of the gas diffusion electrode substrate, precisely weighed, and placed in a measurement cell in such a way as not to overlap one another, into which measurement cell mercury was then poured under reduced pressure. Then, measurements were made under the below-described conditions.

Measurement pressure range: 6 kPa pressure at the start of measurement (pore size: 400 μm) to 414 MPa pressure at the completion of measurement (pore size: 30 nm)

Measurement cell mode: pressure-raising process in the above-mentioned pressure range Cell volume: 5 cm$^3$ Mercury surface tension: 485 dyn/cm Mercury contact angle: 130°

As the measurement device, Autopore 9520, made by Shimadzu Corporation, was used.

<Measurement of Pore Size Peak of Dense Portion A>

The pore size peak of the dense portion A was determined by calculation using the following equation from the pore size peak of the dense portion B, the primary particle size of the carbonaceous powder contained in the dense portion B, and the primary particle size of the carbonaceous powder contained in the dense portion A. Pore Size Peak of Dense Portion A=Pore Size Peak of Dense Portion B×Primary Particle Size of Carbonaceous Powder Contained in Dense Portion A/Primary Particle Size of Carbonaceous Powder Contained in Dense Portion B <Measurement of Pore Size Peak of Microporous Layer 2>

The pore size peak of the microporous layer 2 was determined by calculation using the following equation from the pore size peak of the dense portion B, the primary particle size of the carbonaceous powder contained in the dense portion B, and the primary particle size of the carbonaceous powder contained in the microporous layer 2. Pore Size Peak of Microporous Layer 2=Pore Size Peak of Dense Portion B×Primary Particle Size of Carbonaceous Powder Contained in Microporous Layer 2/Primary Particle Size of Carbonaceous Powder Contained in Dense Portion B <Measurement of Water Contact Angle of Microporous Layer Side>

The water contact angle on the microporous layer side of the gas diffusion electrode substrate was measured using an automated contact angle meter. As the meter, an automated contact angle meter DM-501, made by Kyowa Interface Science Co., Ltd., was used. The gas diffusion electrode substrate was fixed on the stage in the device with the microporous layer side facing upward (measurement side), a 5 µL droplet of ion exchange water was attached on the microporous layer and allowed to stand for one second, and then the water contact angle was automatically measured and determined.

<Evaluation of Number of Fluffy Points of Electrically Conductive Porous Substrate>

The number of fluffy points of the electrically conductive porous substrate was determined by: observing a side of the electrically conductive porous substrate photographed using a digital microscope at a magnification ratio of 100× or more; counting the number of carbon fibers protruding 100 µm or more from the surface of the electrically conductive porous substrate; and dividing the number by a measurement area determined from the top surface of the electrically conductive porous substrate.

<Evaluation of Number of Fluffy Points of Microporous Layer Side of Gas Diffusion Electrode Substrate>

The number of fluffy points of the gas diffusion electrode substrate was determined by: observing a side of the gas diffusion electrode substrate photographed using a digital microscope at a magnification ratio of 100x or more; counting the number of carbon fibers protruding 100 µm or more from the surface of the gas diffusion electrode substrate; and dividing the number by a measurement area determined from the top surface of the gas diffusion electrode substrate.

<Evaluation of Power Generation Performance>

Two sheets of the gas diffusion electrode substrate obtained were respectively disposed on both sides of an integrated combination of an electrolyte membrane and a catalyst layer (a catalyst layer "PRIMEA" (registered trademark) made by W. L. Gore & Associates, Co., LTD. formed on both sides of an electrolyte membrane "GORESELECT" (registered trademark) made by W. L. Gore & Associates, Co., LTD.) such that the catalyst layer is in contact with the microporous layer, and the resulting set was hot-pressed to make a laminate (membrane electrode assembly (MEA)). This laminate was incorporated in a single cell for a fuel cell, settings were made such that the cell temperature, fuel usage efficiency, and air usage efficiency were 40° C., 70%, and 40% respectively, the hydrogen at the anode side and the air at the cathode side were humidified to have a dew point of 75° C. and 60° C. respectively, and the cell was allowed to generate power. The current density was continuously raised, and a current density value at which power generation stopped (critical current density) was determined. The higher this value is, the better the flooding resistance is.

<Evaluation of Short Circuit Current Density>

A short circuit current density was measured using the procedures (1) to (3), and thereby the short circuit resistance was evaluated. The smaller the short circuit current density is, the less the short circuit is, and the better the short circuit resistance and the fuel cell durability are.

(1) A polymer electrolyte membrane ("Nafion" (registered trademark) NR211 (made by DuPont) having a film thickness of 25 µm) was layered on the microporous layer side of the gas diffusion electrode substrate. Here, the gas diffusion electrode substrate was made into a 5 cm square shape, the polymer electrolyte membrane was made into a 6 cm or more square shape, and the polymer electrolyte membrane and the gas diffusion electrode substrate were layered one on the other such that each edge of the polymer electrolyte membrane was in parallel with each edge of the gas diffusion electrode substrate, and the center of the one was in alignment with the center of the other.

(2) The layered piece including the polymer electrolyte membrane and the gas diffusion electrode substrate was sandwiched between two gold plated stainless steel block electrodes (the area sandwiched was in the shape 3 cm square) and pressurized such that a pressure of 5 MPa was applied to the 9 $cm^2$ area of the gas diffusion electrode substrate. Here, the layered piece was sandwiched such that each edge of the sandwiched side of the stainless steel block electrode was in parallel with each edge of the gas diffusion electrode substrate, and the center of the stainless steel block electrode was in alignment with the center of the gas diffusion electrode substrate.

(3) A digital multimeter (KEITHLEY Model 196 SYSTEM DMM) was used to apply a 2V direct-current voltage across the gold plated stainless steel block electrodes to measure a current across the electrodes, and the value obtained was regarded as a short circuit current.

The steps from (1) to (3) were repeated 10 times, the average of the short circuit current values was calculated, the average of the short circuit current values was divided by an electrode area of 9 $cm^2$ to determine the short circuit current density.

Example 1

The microporous layer coating liquids were prepared as follows.

Microporous Layer Coating Liquid A and Microporous Layer Coating Liquid 2: A 15 parts by mass amount of carbon black 2 having a primary particle size of 30 nm, 5 parts by mass of FEP dispersion ("NEOFLON" (registered trademark) ND-110), 15 parts by mass of a surfactant ("TRITON" (registered trademark) X-100), and 65 parts by mass of purified water were kneaded using a planetary mixer to prepare a coating liquid.

Microporous Layer Coating Liquid B:

A 5 parts by mass amount of carbon black 1 having a primary particle size of 58 nm, 2 parts by mass of FEP dispersion ("NEOFLON" (registered trademark) ND-110), 7 parts by mass of a surfactant ("TRITON" (registered trademark) X-100), and 86 parts by mass of purified water were kneaded using a planetary mixer to prepare a coating liquid.

The electrically conductive porous substrate was coated with the microporous layer coating liquid B using a die coater such that the microporous layer would have an areal weight of 22 $g/m^2$ when sintered, and then the resultant sample was dried at a temperature of 120° C. for 10 minutes. The coating film thus obtained was the dense portion B of the microporous layer 1.

Further, the dense portion B was subjected to laser processing so as to have concaves which each had a width of 30 µm and a thickness corresponding to 60% of that of the dense portion B and which were made one each per 1 mm square. The microporous layer coating liquid A was applied by ink jet coating onto the concave parts made in the dense portion B as above and then dried a temperature of 120° C. for 10 minutes, and the dense portion A was thus made so as to fill the concave parts of the dense portion B. The subsequent heating at temperature of 380° C. for 10 minutes afforded a gas diffusion electrode substrate. The evaluation results for the gas diffusion electrode substrate obtained are shown in Table 1.

Example 2

A gas diffusion electrode substrate was obtained in the same manner as in Example 1 except that the method of coating the microporous layer coating liquid A was changed to die coater coating, and the dense portion A and the microporous layer 2 were simultaneously formed. The properties are shown in Table 1.

Example 3

A gas diffusion electrode substrate was obtained in the same manner as in Example 2 except that changes were made such the concaves made in the dense portion B by laser processing had a larger depth so that the dense portion A could have a thickness of 85% with respect to the thickness of the microporous layer 1 as 100%. The properties are shown in Table 1.

Example 4

A gas diffusion electrode substrate was obtained in the same manner as in Example 2 except that changes were made such the concaves made in the dense portion B by laser processing had a smaller depth so that the dense portion A could have a thickness of 45% with respect to the thickness of the microporous layer 1 as 100%. The properties are shown in Table 1.

Example 5

A gas diffusion electrode substrate was obtained in the same manner as in Example 2 except that changes were made such that the concaves made in the dense portion B by laser processing had a larger width so that the dense portion A could have a width of 120 µm. The properties are shown in Table 1.

Example 6

A gas diffusion electrode substrate was obtained in the same manner as in Example 2 except that changes were made such that the concaves made in the dense portion B by laser processing had a smaller width so that the dense portion A could have a width of 17 µm. The properties are shown in Table 2.

Example 7

A gas diffusion electrode substrate was obtained in the same manner as in Example 2 except that changes were made such that the coating amount of the microporous layer coating liquid A was increased so that the microporous layer 2 could have a thickness of 9 µm. The properties are shown in Table 2.

Example 8

A gas diffusion electrode substrate was obtained in the same manner as in Example 2 except that changes were made such that the coating amount of the microporous layer coating liquid A was increased so that the microporous layer 2 could have a thickness of 15 µm. The properties are shown in Table 2.

Example 9

A gas diffusion electrode substrate was obtained in the same manner as in Example 1 except that the dense portion A which had been formed was coated, using a die coater, with the microporous layer coating liquid 2 containing a carbon black 1 having a primary particle size of 58 nm and dried at a temperature of 120° C. for ten minutes. The properties are shown in Table 2.

Comparative Example 1

A gas diffusion electrode substrate was obtained in the same manner as in Example 1 except that neither laser processing nor the application of the microporous layer coating liquid A were carried out. The properties are shown in Table 2.

Comparative Example 2

A gas diffusion electrode substrate was obtained in the same manner as in Example 1 except that the carbonaceous powder contained in the microporous layer coating liquid B was changed to a carbon black 2 having a primary particle of 30 nm, and neither laser processing nor the application of the microporous layer coating liquid A were carried out. The properties are shown in Table 3.

Comparative Example 3

A gas diffusion electrode substrate was obtained in the same manner as in Example 1 except that changes were made such that the concaves made in the dense portion B by laser processing had a larger width so that the dense portion A could have a width of 250 µm. The properties are shown in Table 3.

Comparative Example 4

A gas diffusion electrode substrate was obtained in the same manner as in Example 1 except that changes were made such the concaves made in the dense portion B by laser processing had a smaller depth so that the dense portion A could have a thickness of 20% with respect to the thickness of the microporous layer 1 as 100%. The properties are shown in Table 3.

Comparative Example 5

A gas diffusion electrode substrate was obtained in the same manner as in Example 1 except that the FEP dispersion was not added to the microporous layer coating liquid A. The properties are shown in Table 3.

TABLE 1

|  |  | Unit | Example 1 | Example 2 | Example 3 | Example 4 | Example 5 |
| --- | --- | --- | --- | --- | --- | --- | --- |
| Electrically Conductive Porous Substrate | Number of Fluffy Points | points/cm$^2$ | 0.9 | 0.9 | 0.9 | 0.9 | 0.9 |
| Microporous Layer1 | Thickness | μm | 25 | 25 | 25 | 25 | 25 |
| Dense Portion A | Primary Particle Size of Carbonaceous Powder | nm | 30 | 30 | 30 | 30 | 30 |
|  | Thickness | % | 60 | 60 | 85 | 45 | 60 |
|  | Width | μm | 30 | 30 | 30 | 30 | 120 |
|  | Pore Size Peak | μm | 0.17 | 0.17 | 0.17 | 0.17 | 0.17 |
| Dense Portion B | Primary Particle Size of Carbonaceous Powder | nm | 58 | 58 | 58 | 58 | 58 |
|  | Thickness | μm | 25 | 25 | 25 | 25 | 25 |
|  | Pore Size Peak | μm | 0.33 | 0.33 | 0.33 | 0.33 | 0.33 |
| Microporous Layer2 | Primary Particle Size of Carbonaceous Powder | nm | — | 30 | 30 | 30 | 30 |
|  | Thickness | μm | — | 5 | 5 | 5 | 5 |
|  | Pore Size Peak | μm | — | 0.17 | 0.17 | 0.17 | 0.17 |
| Gas Diffusion Electrode Substrate | T (0.15)-T (3.00) | μm | 59 | 50 | 35 | 55 | 35 |
|  | Water Contact Angle on Microporous Layer Side | degree | 150 | 150 | 150 | 150 | 150 |
|  | Number of Fluffy Points on Microporous Layer Side | points/cm$^2$ | 0.3 | 0.1 | 0.1 | 0.1 | 0.1 |
|  | Short Circuit Current Density | mA/cm$^2$ | 10 | 4 | 3 | 5 | 3 |
|  | Power Generation Performance | A/cm$^2$ | 1.74 | 1.82 | 1.64 | 1.63 | 1.63 |

TABLE 2

|  |  | Unit | Example 6 | Example 7 | Example 8 | Example 9 | Comparative Example 1 |
| --- | --- | --- | --- | --- | --- | --- | --- |
| Electrically Conductive Porous Substrate | Number of Fluffy Points | points/cm$^2$ | 0.9 | 0.9 | 0.9 | 0.9 | 0.9 |
| Microporous Layer1 | Thickness | μm | 25 | 25 | 25 | 25 | 25 |
| Dense Portion A | Primary Particle Size of Carbonaceous Powder | nm | 30 | 30 | 30 | 30 | — |
|  | Thickness | % | 60 | 60 | 60 | 60 | — |
|  | Width | μm | 17 | 30 | 30 | 30 | — |
|  | Pore Size Peak | μm | 0.17 | 0.17 | 0.17 | 0.17 | — |
| Dense Portion B | Primary Particle Size of Carbonaceous Powder | nm | 58 | 58 | 58 | 58 | 58 |
|  | Thickness | μm | 25 | 25 | 25 | 25 | 25 |
|  | Pore Size Peak | μm | 0.33 | 0.33 | 0.33 | 0.33 | 0.33 |
| Microporous Layer2 | Primary Particle Size of Carbonaceous Powder | nm | 30 | 30 | 30 | 58 | — |
|  | Thickness | μm | 5 | 9 | 15 | 5 | — |
|  | Pore Size Peak | μm | 0.17 | 0.17 | 0.17 | 0.33 | — |
| Gas Diffusion Electrode Substrate | T (0.15)-T (3.00) | μm | 55 | 55 | 59 | 59 | 70 |
|  | Water Contact Angle on Microporous Layer Side | degree | 150 | 150 | 150 | 150 | 150 |
|  | Number of Fluffy Points on Microporous Layer Side | points/cm$^2$ | 0.1 | 0.08 | 0.06 | 0.1 | 0.3 |
|  | Short Circuit Current Density | mA/cm$^2$ | 5 | 3 | 2 | 7 | 60 |
|  | Power Generation Performance | A/cm$^2$ | 1.65 | 1.52 | 1.41 | 1.65 | 1.25 |

TABLE 3

|  |  | Unit | Comparative Example 2 | Comparative Example 3 | Comparative Example 4 | Comparative Example 5 |
| --- | --- | --- | --- | --- | --- | --- |
| Electrically Conductive Porous Substrate | Number of Fluffy Points | points/cm$^2$ | 0.9 | 0.9 | 0.9 | 0.9 |
| Microporous Layer1 | Thickness | μm | 25 | 25 | 25 | 25 |
| Dense Portion A | Primary Particle Size of Carbonaceous Powder | nm | — | 30 | 30 | 30 |
|  | Thickness | % | — | 60 | 20 | 60 |
|  | Width | μm | — | 250 | 30 | 30 |
|  | Pore Size Peak | μm | — | 0.17 | 0.17 | 0.17 |
| Dense Portion B | Primary Particle Size of Carbonaceous Powder | nm | 30 | 58 | 58 | 58 |

TABLE 3-continued

|  |  | Unit | Comparative Example 2 | Comparative Example 3 | Comparative Example 4 | Comparative Example 5 |
|---|---|---|---|---|---|---|
| Microporous Layer2 | Thickness | μm | 25 | 25 | 25 | 25 |
|  | Pore Size Peak | μm | 0.33 | 0.33 | 0.33 | 0.33 |
|  | Primary Particle Size of Carbonaceous Powder | nm | — | — | — | — |
|  | Thickness | μm | — | — | — | — |
|  | Pore Size Peak | μm | — | — | — | — |
| Gas Diffusion Electrode Substrate | T (0.15)-T (3.00) | μm | 35 | 35 | 65 | 65 |
|  | Water Contact Angle on Microporous Layer Side | degree | 150 | 150 | 150 | 0 |
|  | Number of Fluffy Points on Microporous Layer Side | points/cm² | 0.3 | 0.3 | 0.3 | 0.3 |
|  | Short Circuit Current Density | mA/cm² | 3 | 3 | 55 | 55 |
|  | Power Generation Performance | A/cm² | 1.19 | 1.19 | 1.25 | 1.02 |

In this regard, the "thickness" of the "dense portion A" in the Tables represents the thickness (%) of the dense portion A with respect to the thickness of the microporous layer 1 as 100%.

REFERENCE SIGNS LIST

1: electrically conductive porous substrate
2: microporous layer 1
3: dense portion A
4: dense portion B
5: microporous layer 2

The invention claimed is:

1. A gas diffusion electrode substrate comprising:
an electrically conductive porous substrate and
a microporous layer-1 on one side of said electrically conductive porous substrate;
wherein said microporous layer-1 comprises a dense portion A and a dense portion B;
wherein said dense portion A is a region including a fluorine resin and a carbonaceous powder having a primary particle size of 20 nm to 39 nm;
wherein said dense portion A has a thickness of 30% to 100% with respect to the thickness of said microporous layer-1 as 100% and a width of 10 μm to 200 μm; and
wherein said dense portion B is a region including a fluorine resin and a carbonaceous powder having a primary particle size of 40 nm to 70 nm.

2. The gas diffusion electrode substrate according to claim 1, wherein a difference (T(0.15)–T(3.00)) between the thickness of said gas diffusion electrode substrate under a pressure of 0.15 MPa T(0.15) and the thickness of said gas diffusion electrode substrate under a pressure of 3.00 MPa T(3.00) is 30 μm to 60 μm.

3. The gas diffusion electrode substrate according to claim 1, wherein the pore size peak of said dense portion B is larger than the pore size peak of said dense portion A.

4. The gas diffusion electrode substrate according to claim 1, wherein the pore size peak of said dense portion A is 0.05 μm to 0.20 μm.

5. The gas diffusion electrode substrate according to claim 1, wherein the pore size peak of said dense portion B is 0.21 μm to 0.60 μm.

6. The gas diffusion electrode substrate according to claim 1, further comprising, on said microporous layer-1, a microporous layer-2 which contains a fluorine resin and a carbonaceous powder having a primary particle size of 20 nm to 39 nm, and which has a thickness of 10 μm or less.

7. The gas diffusion electrode substrate according to claim 6, wherein the pore size peak of said dense portion B is larger than the pore size peak of said microporous layer-2.

8. The gas diffusion electrode substrate according to claim 6, wherein the pore size peak of said microporous layer-2 is 0.05 μm to 0.20 μm.

9. The gas diffusion electrode substrate according to claim 1, wherein said carbonaceous powder is carbon black.

10. The gas diffusion electrode substrate according to claim 1, wherein a water contact angle to the microporous layer side of said gas diffusion electrode substrate is 130 degrees or more.

11. The gas diffusion electrode substrate according to claim 1, wherein the number of fluffy points on the microporous layer side of said gas diffusion electrode substrate is 0.5 points/cm² or less.

12. The gas diffusion electrode substrate according to claim 1, wherein the number of fluffy points on said electrically conductive porous substrate is 1.0 points/cm² or less.

13. A laminate comprising a catalyst layer on the microporous layer side of said gas diffusion electrode substrate according to claim 1.

14. A fuel cell comprising said gas diffusion electrode substrate according to claim 1.

* * * * *